(12) United States Patent
Wijeyesekera et al.

(10) Patent No.: US 6,776,035 B2
(45) Date of Patent: Aug. 17, 2004

(54) METHOD AND DEVICE FOR CALIBRATION OF DUAL-AXIS TILT METER

(75) Inventors: Nihal Wijeyesekera, Stafford, TX (US); Thomas Little, Kingwood, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 82 days.

(21) Appl. No.: 10/065,035

(22) Filed: Sep. 12, 2002

(65) Prior Publication Data

US 2004/0050141 A1 Mar. 18, 2004

(51) Int. Cl.[7] .............................................. G01P 21/00
(52) U.S. Cl. .................. 73/188; 73/152.49; 73/152.54; 73/152.59; 73/382 R; 73/382 G
(58) Field of Search ................. 73/1.88, 152.4, 73/3, 152.49, 1, 52.54, 152, 59, 156, 382 R, 382 G, 383, 1.37, 1.38, 1.39, 1.41, 1.75, 1.77

(56) References Cited

U.S. PATENT DOCUMENTS

| | | | | |
|---|---|---|---|---|
| 3,474,672 A | * | 10/1969 | Lacoste et al. | 73/382 R |
| 3,630,086 A | * | 12/1971 | Wilk | 73/382 R |
| 3,888,122 A | * | 6/1975 | Black | 73/382 R |
| 4,445,371 A | * | 5/1984 | Lautzenhiser | 73/382 R |
| 4,457,077 A | | 7/1984 | Lautzenhiser | |
| 4,457,168 A | * | 7/1984 | Lautzenhiser et al. | 73/382 R |
| 5,112,126 A | | 5/1992 | Graebner | |
| 5,204,568 A | * | 4/1993 | Kleinberg et al. | 310/90.5 |
| 5,341,681 A | * | 8/1994 | Molny et al. | 73/382 G |
| 5,461,914 A | * | 10/1995 | Zumberge et al. | 73/382 R |
| 5,606,124 A | | 2/1997 | Doyle et al. | |
| 5,728,935 A | * | 3/1998 | Czompo | 73/382 G |
| 5,869,759 A | * | 2/1999 | Seigel | 73/382 R |
| 5,970,787 A | * | 10/1999 | Wignall | 73/152.54 |
| 6,450,028 B1 | * | 9/2002 | Vail, III | 73/382 G |
| 6,518,756 B1 | * | 2/2003 | Morys et al. | 324/303 |
| 6,590,536 B1 | * | 7/2003 | Walton | 342/463 |
| 6,615,660 B1 | * | 9/2003 | Feinberg et al. | 73/382 R |
| 2002/0152810 A1 | * | 10/2002 | Couture | 73/382 R |

OTHER PUBLICATIONS

Hugill, Dr A Al, "The New Scintrex CG–3 Autograv Gravity Meter", Feb. 1998, ASEG/SEG Conference.*
Brcic et al. "Recent Performance Evaluations and Applications of the Scintrex CG–3M Microgravimeter", 1998.*
Lacoste et al. "Lacoste and Romberg Stabilized Shipboard Gravity Meter", Feb. 1967, Geophysics, Col. 32, No. 1, pp. 99–109.*
Lacoste, Lucien "Surface Ship Gravity Measurements on the Texas A and M College Ship, The "Hidalgo"", Apr. 1959, Geophysics, Vol. 24, No. 2, pp. 309–322.*

* cited by examiner

Primary Examiner—Hezron Williams
Assistant Examiner—David A. Rogers
(74) Attorney, Agent, or Firm—Victor H. Segura; Brigitte L. Jeffery; John J. Ryberg

(57) ABSTRACT

The invention is directed toward a subsurface gravity measurement device and a method for calibrating the same that includes a tilt meter and a gravity sensor. The method includes associating tilt information produced by the gravity sensor as a function of a relationship between tilt information produced by the tilt meter and a correction parameter. The tilt meter produces tilt data, and the gravity meter produces gravity data, corresponding to the tilt data. The tilt data and gravity data is fitted to a polynomial equation that has a plurality of initial coefficients associated therewith. The initial coefficients includes information concerning the correction parameter. The correction parameter is derived as a function of the initial coefficients.

23 Claims, 3 Drawing Sheets

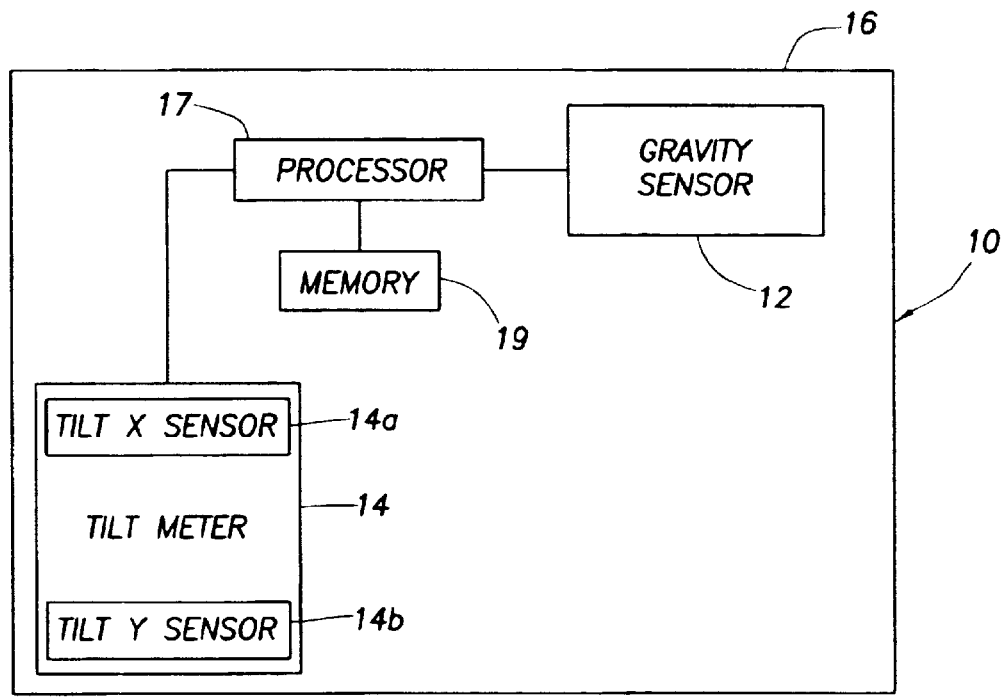
FIG.1
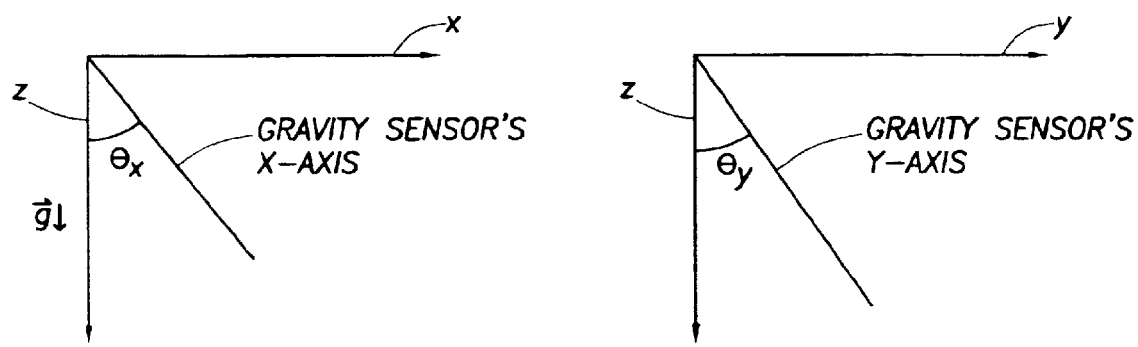
FIG.2
FIG.3

METHOD AND DEVICE FOR CALIBRATION OF DUAL-AXIS TILT METER

BACKGROUND OF INVENTION

1. Field of the Invention

The present invention concerns downhole/borehole gravity meters that sense variation in gravitational fields. More particularly, the present invention is directed to a dual-axis, tilt meter employed in subsurface oil exploration and retrieval.

2. Background Art

Gravity meters have been employed to measure characteristics of geologic formation and are used in the exploitation of hydrocarbon reservoirs found in geologic formations, commonly referred to as oil exploration and retrieval. Specifically, exploitation of hydrocarbon reservoirs involves characterizing oil, gas, and/or water.

Characterization of oil and gas in a hydrocarbon reservoir can be monitored as a function of gravity by analyzing borehole and surface gravity data. To that end, borehole gravity data is used to map out the vertical distribution of oil and gas at a well and surface gravity data can be employed to characterize the area of distribution.

Typically, borehole gravity surveys involve measuring gravity at differing locations in a borehole, which typically correspond to different vertical distances from the surface. The difference in gravity ($\Delta \bar{g}$) and the difference in vertical distance ($\Delta \bar{z}$) between two successive locations yield sufficient information to determine the bulk density of an area of the geologic formation adjacent to the borehole. The information concerning bulk rock density is mapped to determine the vertical distribution of oil and gas as the reservoir is exploited.

As a result, gravity measurements are typically monitored in the microgal ($10^6$ cm/s$^2$) or nano-g range to ensure useable data that provides an indication of untapped pockets of oil or gas in the aforementioned area. This level of resolution in gravity measurements requires a highly precise gravity sensor and carefully implemented measuring techniques. For instance, the gravity sensor must be oriented so that the sensitive axis of the sensor is parallel to a vertical line representing the direction of gravity and commonly referred to as the plumb line.

To assist in properly aligning gravity sensors, many gravity meters include a tilt meter. The tilt meter is employed to minimize inclination of the gravity sensor>sensitive axis with respect to the plumb line. The tilt meter, however, must be properly aligned with respect to the gravity sensor for best results. Further, the relative alignment of the tilt meter and the gravity sensor should be checked periodically as the same may vary due to shock or vibration that occurs during field operations, particularly during transportation and handling. Another related issue is the sensitivity of the tilt meter, which may also change over time due to aging of the tilt meter and electronic components. In order to correct for these problems, the tilt meter is preferably calibrated prior to a gravity survey.

An exemplary gravity meter that includes the tilt meter/ gravity sensor combination is available from SCINTREX® under the trade name CG-3. The CG-3 is a surface gravity meter, and the calibration method employed includes calibrating each tilt axis separately, with the axis orthogonal thereto remaining fixed The gain and offset of the calibration on each tilt axis are computed separately. The deviation from the plumb line is computed First, providing a calibrated offset value. The gain or sensitivity is then computed as a result of the calibrated offset value.

A drawback with the aforementioned calibration technique is that the same is difficult to employ in a subsurface gravity measurement tool, because calibrating the gravity tool based upon a fixed orthogonal axis introduces errors.

A need exists, therefore, to provide a method and a system to calibrate a gravity tool to provide accurate subsurface gravity measurements.

SUMMARY OF THE INVENTION

The invention provides a method for calibrating a subsurface gravity measurement device having a tilt meter and a gravity sensor. The method comprises associating tilt information produced by the gravity sensor as a function of tilt information produced by the tilt meter and an initial correction parameter; producing tilt data with the tilt meter, and gravity data, corresponding to the tilt data, with the gravity data being produced by the gravity sensor; fitting the tilt data and the gravity data to a polynomial equation, with the polynomial equation having a plurality of initial coefficients associated therewith, the initial coefficients including information concerning the initial correction parameter; and deriving a correction parameter as a function of the initial coefficients The invention provides a method for calibrating, with respect to a plumb line, a gravity measurement device having a tilt meter and a gravity sensor. The method comprises associating tilt information produced by the gravity sensor as a function of a relationship between tilt information produced by the tilt meter and an initial correction parameter; orientating the tilt meter in a plurality of differing angular positions with respect to the plumb line, defining tilt data measuring, with the gravity sensor, gravity information at each of the angular positions defining gravity data; fitting the tilt data and the gravity data to a polynomial equation, with the polynomial equation having a plurality of initial coefficients associated therewith, the coefficients including information concerning the correction parameter; determining values for the plurality of initial coefficients using a least-squares regression; and deriving a correction parameter as a function of the coefficient values.

The invention provides a subsurface gravity measurement device, comprising a body: a tilt meter connected to the body to produce tilt data concerning angular positions the tilt meter forms with respect to a direction of gravity, with the direction of gravity defining a plumb line; a gravity sensor connected to measure the gravity and to produce information corresponding thereto, defining gravity data, with the information being a function of an angle the gravity measurement device forms with respect to the plumb line, defining tilt information, a processor in data communication with both the gravity sensor and the tilt meter; and a memory in data communication with the processor, the memory including a computer readable program to be operated on by the processor that includes a first subroutine to define a relationship between the tilt information produced by the gravity sensor and both the tilt data and an initial correction parameter, and a second subroutine to fit the tilt data and the gravity data to a polynomial equation, with the polynomial equation having a plurality of initial coefficients associated therewith, the initial coefficients including information concerning the correction parameter, and a third subroutine to derive a correction parameter as a function of the initial coefficients.

BRIEF DESCRIPTION OF THE DRAWINGS

FIG. 1 is a simplified plan view of the gravity measurement device in accordance with the present invention, FIG. 2 is a graph showing the orientation of the X-axis of a gravity sensor included in the gravity measurement device of FIG. 1 with respect to a direction of gravity;

FIG. 3 is a graph showing the orientation of the Y-axis of a gravity sensor included in the gravity measurement device of FIG. 1 with respect to a direction of gravity;

DETAILED DESCRIPTION

Figure 4:
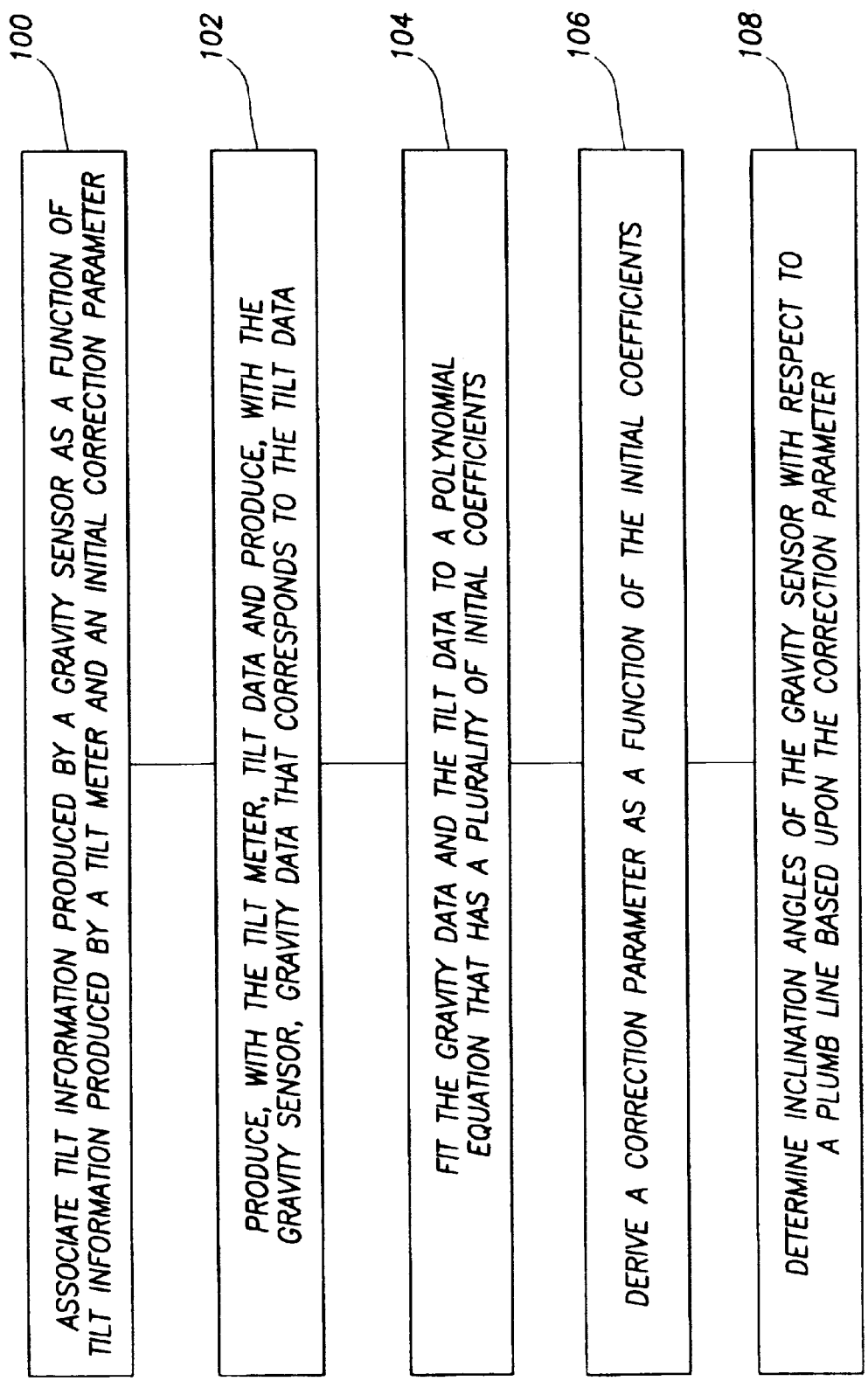
FIG. 4 is a flow diagram showing a method of calibrating the gravity meter shown in FIG. 1 in accordance with one embodiment of the present invention.

Referring to FIG. 1, a gravity measurement device 10 in accordance with one embodiment of the present invention is suitable for downhole gravity measurements typically employed in the exploitation of hydrocarbon reservoirs found in naturally occurring geologic formations. To that end, gravity measurement device 10 includes a gravity sensor 12 and a tilt meter 14 connected to a common body 16 to fix the relative position of gravity sensor 12 and tilt meter 14. Gravity sensor 12 may be any known gravity sensor in the art, such as a spring-mass-type, falling body/ free-fall-type, pendulum-type and the like. Tilt meter 14 may be any tilt meter known in the art, such as an electronic pendulum-type, electronic bubble-type and the like. Tilt meter 14 is capable of sensing angles of inclination in two orthogonal axes. To that end, tilt meter 14 includes an X-axis tilt sensor 14a and a Y-axis tilt sensor 14b. Gravity sensor 12 and tilt meter 14 are coupled together so that tilt meter 14 is able to sense any change in the angle of inclination of gravity sensor 12. As a result, both gravity sensor 12 and tilt meter 14 are fixedly attached to body 16. Operation of gravity measurement device 10 is controlled by a processor 17 operating on a computer readable program stored in a memory 19 that is in data communication with processor 17. The processor 17 is in data communication with both gravity sensor 12 and tilt meter 14.

Referring to both FIGS. 1 and 2, to ensure gravity sensor 12 provides accurate measurements the angle of inclination that gravity sensor 12 has with respect to a direction of gravity, $\bar{g}$, referred to as a plumb line, is determined. Specifically, gravity sensor 12 is sensitive to the position of the two transverse axes, both of which are orthogonal to the plumb line. Assuming that the plumb line extends along the Z-axis, the transverse axes are defined to be along the X and Y-axes. To obtain accurate measurements of gravity, it is important to determine the inclination angle $\theta_x$, between the gravity sensor 12's X-axis and the plumb line. Similarly, accurate gravity measurements by gravity sensor 12 are also dependent upon knowing the inclination angle, $\theta_y$, between the gravity sensor 12's Y-axis and the plumb line, shown more clearly in FIG. 3.

Referring to FIGS. 1–3, to that end, tilt meter 14 is employed to determine the angles of inclination $\theta_x$ and $\theta_y$. However, this assumes that the sensing axes of tilt meter 14 are aligned with the sensing axes of gravity sensor 12. This is not always the case. Assuming that perfect alignment always exists between the sensing axes of the tilt meter 14 and the sensing axes of gravity sensor 12 is problematic, as this alignment may change over the operational life of gravity measurement device 10. This introduces errors in the gravity measurement made by gravity sensor 12.

To abrogate errors in gravity measurements made by gravity sensor 12, a calibration procedure is employed to define the relationship between inclination angles $\theta_x$ and $\theta_y$ and tilt measurements $X_m$ and $Y_m$ sensed by tilt meter 14.

For example, the relationship between $\theta_x$ and $\theta_y$ and the measured tilt angles $X_m$ and $Y_m$ may be defined as follows:

$$\theta_x = k_x(x_m + \epsilon_x), \quad (1)$$

$$\theta_y = k_y(y_m + \epsilon_y), \quad (2)$$

where $k_x$ and $\epsilon_x$ are the gain and offset values, respectively, associated with measurements along the X-axis. The variables $k_y$ and $\epsilon_y$ are the gain and offset values, respectively, associated with measurements along the Y-axis. The values $k_x, \epsilon_x$ are correction parameters that define the difference between the inclination $\theta_x$ and tilt measurement $X_m$. Likewise the values $k_y, \epsilon_y$ are correction parameters that define the difference between the inclination $\theta_y$ and tilt measurement $Y_m$. These correction parameters are referred to collectively as correction parameters $k, \epsilon$.

Were gravity sensor 12 aligned so that $\theta_x$ and $\theta_y$ were 0°, the gravity measurement, $R_0$, would be a maximum value. From the foregoing it can be shown that the measured gravity, $R_m$, is defined as follows:

$$R_m = R_0 - \bar{g}(1 - \cos\theta_x \cos\theta_y), \quad (3)$$

where $\bar{g}$ is the average gravity in the region. Since angles $\theta_x$ and $\theta_y$ are small and measured in radians, a cosine approximation is employed that abrogates the higher order terms so that Equation (3) may be expressed as follows:

$$R_m = R_o - \bar{g}\left[\left[\frac{\theta_x^2}{2} + \frac{\theta_y^2}{2}\right] - \frac{\theta_x^2 \theta_y^2}{4}\right]. \quad (4)$$

Again the smallness of angles $\Theta_1$ and $\Theta_2$ allows abrogation of the higher order terms so that equation (4) may be expressed as follows:

$$R_m = R_o - \bar{g}\left[\left[\frac{\theta_x^2}{2} + \frac{\theta_y^2}{2}\right]\right]. \quad (5)$$

Substituting the values for $\theta_x$ and $\theta_y$ from Equations (1) and (2), Equation (5) is expressed as follows:

$$R_m = -\frac{\bar{g}k_x^2}{2}x_m^2 - \bar{g}\epsilon_x k_x^2 x_m - \frac{\bar{g}k_y^2}{2}y_m^2 - \bar{g}\epsilon_y k_y^2 y_m - \frac{\bar{g}}{2}(k_x^2\epsilon_x^2 + k_y^2\epsilon_y^2) + R_o. \quad (6)$$

It is seen that Equation (6) is a polynomial having the general form as follows:

$$R_m = ax_m^2 + bx_m + cy_m^2 + dy_m + e. \quad (7)$$

The polynomial has a plurality of coefficients associated therewith: a, b, c, d and e. The values of coefficients a, b, c, d and e may be ascertained employing a linear least-squares regression. Knowing the values of the coefficients a, b, c, d and e, the correction parameters $k, \epsilon$ may be derived by solving for k and $\epsilon$ in both the X-axis and the Y-axis as follows:

$$k_x^2 = -\frac{2a}{\bar{g}}, \quad (8)$$

$$\varepsilon_x = -\frac{b}{gk_x^2}, \tag{9}$$

$$k_y^2 = -\frac{2c}{g}, \tag{10}$$

$$\varepsilon_y = -\frac{d}{gk_y^2}. \tag{11}$$

The values for the correction parameters may be substituted into Equations (1) and (2) to determine the inclination angles $\theta_x$ and $\theta_y$. Thereafter, the inclination angles are included in the gravity measurement performed by gravity sensor 12, using well-known techniques. In this fashion gravity measurement device 10 is calibrated to provide accurate gravity measurements in any environment. Further accuracy could be ensured by appropriately weighting the measurements $R_m$. For example, gravity measurements, $R_m$, made at the varying angles $X_m$ and $Y_m$ may be weighted so that the weight given to a particularly gravity measurement, $R_m$, is inversely proportional to the standard deviation of the gravity associated with the measurement.

Referring to FIGS. 1 and 4, as discussed above, the operation of gravity measurement system 10 is under control of processor 17 operating on a computer readable program stored in memory 19. To that end, the computer readable program may be programmed using any language known in the computer art to include the subroutines necessary to carryout the calibration of the gravity measurement device 10 in accordance with the present invention.

In one embodiment, the computer readable program stored in memory 19 would facilitate a method of calibrating gravity measurement device 10 by associating tilt information produced by gravity sensor 12 as a function of tilt information produced by the tilt meter 14 and correction parameters k,ϵ at step 100. At step 102, tilt meter 14 produces tilt data and gravity sensor 12 produces gravity data that corresponds to the tilt data Specifically, a plurality of gravity measurements, $R_m$, are made by gravity sensor 12 at pairs of tilt angles $X_m$ and $Y_m$. The number of differing tilt angles $X_m$ and $Y_m$ at which gravity measurements are made is typically no less than five, i.e., m=1–5. At step 104, the tilt data and gravity data produced at step 102 are fitted to a polynomial equation that has a plurality of initial coefficients, a, b, c, d and e, associated therewith. This fitting is performed employing a least means-squared regression. Initial coefficients, a, b, c, d and e, Include information concerning correction parameters k,ϵ. At step 106, correction parameters k,ϵ are derived as a function of initial coefficients a, b, c, d and e. At step 108, inclination angles, $\theta_x$ and $\theta_y$, are determined based upon the correction parameters, k,ϵ. Thereafter, gravity measurement device 10 may be employed to make gravity measurements based upon the known value of inclination angles $\theta_x$ and $\theta_y$.

In accordance with another embodiment of the present invention, an additional step may be included in the method discussed with respect to FIG. 4 in which a measurement of the goodness fit of the polynomial in Equation (7) is determined. The goodness fit measurement may be performed by employing a chi-square statistic defined as follows:

$$X^2 = \Sigma |(R\, mi - (ax_{mi}^2 + bx_{mi} + cy_{mi}^2 + dy_{mi} + e))|^2 / \sigma_i^2, \tag{12}$$

wherein $\sigma_i^2$ is the weighting factor mentioned above. The smaller the value of $\chi^2$ the better the goodness fit of the underlying polynomial equation and, hence, the accuracy of the inclination angles $\theta_x$ and $\theta_y$.

Considering that the value of $\chi^2$ decreases as the number of gravity measurements increase, in another embodiment, a normalized chi-square statistic, $\chi_v^2$ may be employed. In this mariner, the normalized chi-square statistic is defined as follows:

$$\chi_v^2 = X^2/(N-n), \tag{13}$$

where N is the number of gravity measurements, and n is the number of unknown parameters. In this case the number of unknown parameters is five: a, b, c, d and e. The closer the value of $\chi_v^2$ is to 1, the more accurate the determination of inclination angles $\theta_x$ and $\theta_y$.

Figure 5:
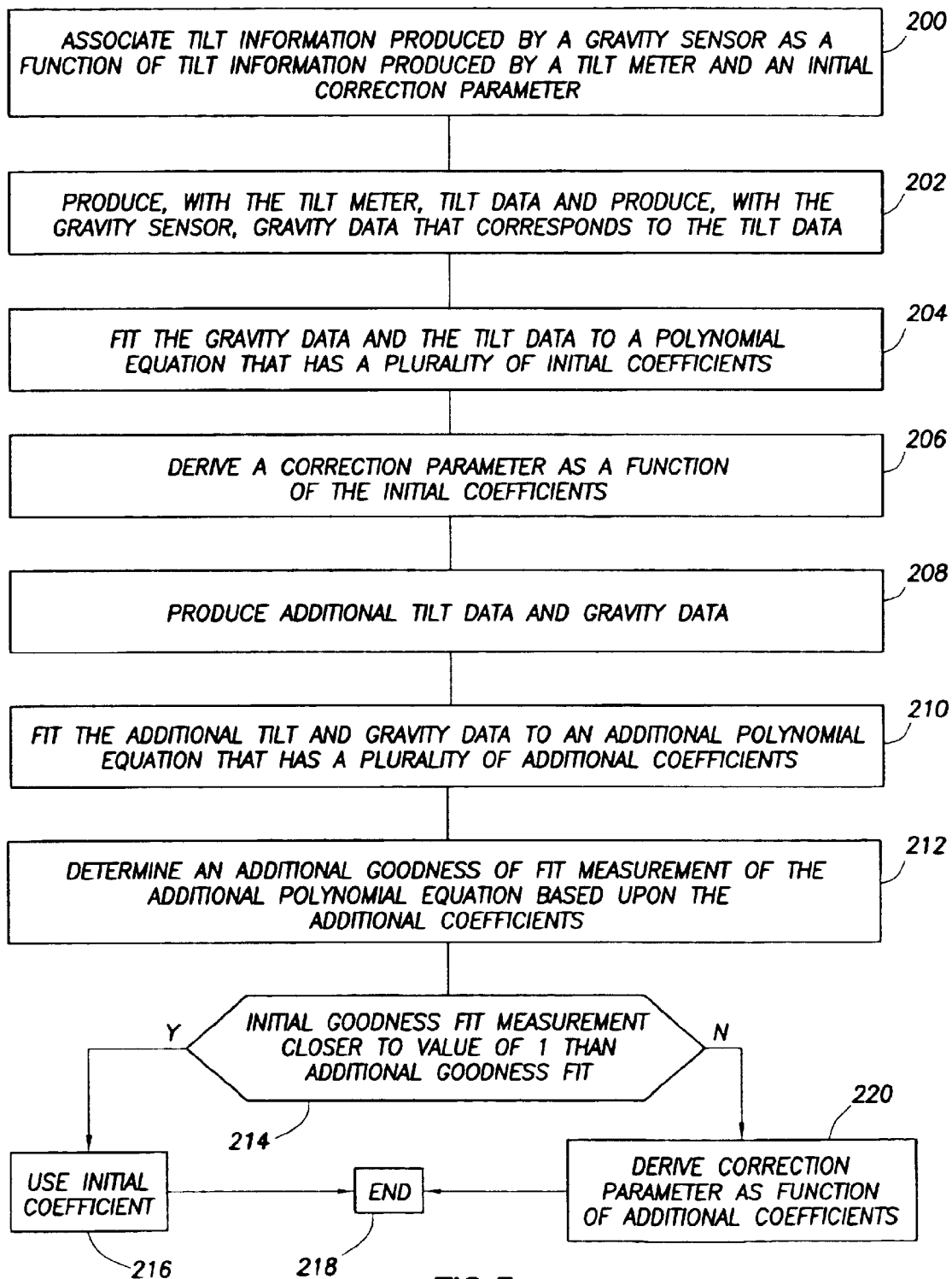
FIG. 5 is a flow diagram showing a method of calibrating the gravity measurement device .shown in FIG. 1 in accordance with an alternate embodiment of the present invention.

Referring to FIG. 5, in yet another embodiment of the present invention, the $\chi^2$ measurement may be analyzed over time during the operation of gravity measurement device 10. In this manner, a calibration history may be obtained to determine whether there has been any change in the relative position of tilt meter 14 with respect to gravity sensor 12 and, if necessary, recalibration of gravity measurement device may be achieved. A method to that end, would include steps 200, 202, 204, 206, which are identical to steps 100, 102, 104 and 106; mentioned above with respect to FIG. 4.

Referring again to FIG. 5, at step 208, additional tilt data and gravity data are produced. The additional tilt and gravity data may or may not occur at the same inclination angles $X_m$ and $Y_m$ from which the initial coefficient values are based. At step 210, the additional tilt and gravity data produced at step 208 are fitted to an additional polynomial equation that has a plurality of additional coefficients, a', b', c', d' and e', associated therewith. At step 212, an additional goodness fit measurement is made of the additional polynomial equation based upon the additional coefficients a', b', c', d' and e'. The goodness fit measurement may be made employing either the non-normalized or the normalized chi-square statistic mentioned above. At step 214, the initial goodness fit measurement is compared with the additional goodness fit measurement to determine whether the initial goodness fit measurement has a value closer to 1 than the additional goodness fit measurement. If this is the case, an initial coefficient is used at step 216 and the calibration ends at step 218. Otherwise, the correction parameters k,ϵ are derived as a function of the additional coefficients at step 220. This process may be repeated periodically based upon the passage of a predetermined amount of time or the occurrence of a predetermined quantity of gravity measurements, or both.

For the purposes of this specification it will be clearly understood that the word "comprising" means "including but not limited to", and that the word "comprises" has a corresponding meaning.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for calibrating a subsurface gravity measurement device having a tilt meter and a gravity sensor, said method comprising:

associating tilt information produced by said gravity sensor as a function of tilt information produced by said tilt meter and at least one initial correction parameter;

producing tilt data with said tilt meter, and gravity data, corresponding to said tilt data, with said gravity data being produced by said gravity sensor;

fitting said tilt data and said gravity data to a polynomial equation, with said polynomial equation having a plurality of initial coefficients associated therewith, said initial coefficients including information concerning said at least one initial correction parameter;

deriving said at least one a correction parameter as a function of said initial coefficients; and calibrating said gravity measurement device using said at least one correction parameter.

2. The method of claim 1 wherein deriving said correction parameter further includes determining values for said plurality of initial coefficients using a least-squares regression.

3. The method of claim 1 wherein producing tilt data further includes orientating said tilt meter in a plurality of differing angular positions with respect to a plumb line, defining tilt data, and measuring, with said gravity sensor, gravity information at each of said angular positions, defining said gravity data.

4. The method of claim 1 wherein producing tilt data further includes orientating said tilt meter in at least five differing sets of angular positions with respect to said plumb line, defining tilt data, and measuring, with said gravity sensor, five gravity measurements, defining said gravity data.

5. The method of claim 1 wherein deriving said correction parameter further includes determining values for said plurality of initial coefficients using a least-squares regression having a weighting function, $\sigma^2$, applied thereto, and deriving said correction parameter as a function of said initial coefficients.

6. The method of claim 1 further including determining whether said initial coefficients satisfy a goodness fit criteria defined by a chi-square statistic, $\chi^2$.

7. The method of claim 6 further including producing additional tilt data and additional gravity data and fitting said additional tilt data and said additional gravity data to an additional polynomial equation having additional coefficients associated therewith, upon determining said initial coefficients failed to satisfy said goodness fit criteria, and deriving said correction parameter as a function of said additional coefficients.

8. The method as recited in claim 1 further including determining whether said initial coefficients satisfy a goodness fit criteria defined by a normalized chi-square statistic, $\chi_\nu^2$, and producing additional tilt data and additional gravity data and fitting said additional tilt data and said additional gravity data to an additional polynomial equation having additional coefficients associated therewith, upon determining said initial coefficients failed to satisfy said goodness fit criteria, and deriving said correction parameter as a function of said additional coefficients.

9. The method of claim 1 further including determining whether said initial coefficients satisfy a goodness fit criteria defined by a normalized chi-square statistic, $\chi^2/(N-n)$, where N corresponds to a number of data points in said gravity data and n corresponds to 5, and producing additional tilt data and additional gravity data and fitting said additional tilt data and said additional gravity data to an additional polynomial equation having additional coefficients associated therewith, upon determining said initial coefficients failed to satisfy said goodness fit criteria, and deriving said correction parameter as a function of said additional coefficients.

10. The method of claim 1 wherein said correction parameter includes information concerning the difference in an angular deviation said tilt meter is from said plumb line compared to an angular deviation of said gravity sensor from said plumb line and further including determining an initial fit measurement of said initial coefficients and producing additional tilt data and additional gravity data and fitting said additional tilt data and said additional gravity data to an additional polynomial equation having additional coefficients associated therewith, and determining an additional goodness fit measurement of said additional coefficients and comparing said initial goodness fit measurement with said additional goodness fit measurement to determine whether said angular deviation has changed.

11. A method for calibrating, with respect to a plumb line, a gravity measurement device having a tilt meter and a gravity sensor, said method comprising:

associating tilt information produced by said gravity sensor as a function of a relationship between tilt information produced by said tilt meter and at least one initial correction parameter;

orientating said tilt meter in a plurality of differing angular positions with respect to said plumb line, defining tilt data;

measuring, with said gravity sensor, gravity information at each of said angular positions, defining gravity data;

fitting said tilt data and said gravity data to a polynomial equation, with said polynomial equation having a plurality of initial coefficients associated therewith, said coefficients including information concerning said at least one correction parameter;

determining values for said plurality of initial coefficients using a least-squares regression, deriving said at least one a correction parameter as a function of said coefficient values; and calibrating said gravity measurement device using said at least one correction parameters.

12. The method of claim 11 wherein producing tilt data further includes orientating said tilt meter in at least five differing sets of angular positions with respect to said plumb line, defining tilt data, and measuring, with said gravity sensor, five gravity measurements, defining said gravity data.

13. The method of claim 11 wherein deriving said correction parameter further includes determining values for said plurality of initial coefficients using a least-squares regression having a weighting function, $\sigma^2$, applied thereto.

14. The method of claim 11 further including determining whether said initial coefficients satisfy a goodness fit criteria defined by a chi-square statistic, $\chi^2$.

15. The method of claim 14 further including producing additional tilt data and additional gravity data and fitting said additional tilt data and said additional gravity data to an additional polynomial equation having additional coefficients associated therewith, upon determining said initial coefficients failed to satisfy said goodness fit criteria, and deriving said correction parameter as a function of said additional coefficients.

16. The method of claim 11 further including determining whether said initial coefficients satisfy a goodness fit criteria defined by a normalized chi-square statistic, $\chi^2/(N-n)$, where N corresponds to a number of data points in said gravity data and n corresponds to 5, and producing additional tilt data and additional gravity data and fitting said additional tilt data and said additional gravity data to an additional polynomial equation having additional coefficients associated therewith, upon determining said initial coefficients failed to satisfy said goodness fit criteria, and deriving said correction parameter as a function of said additional coefficients.

17. The method of claim 11 wherein said correction parameter includes information concerning the difference in an angular deviation said tilt meter is from said plumb line compared to an angular deviation of said gravity sensor from said plumb line and further including determining an initial fit measurement of said initial coefficients and producing additional tilt data and additional gravity data and fitting said additional tilt data and said additional gravity data to an additional polynomial equation having additional coefficients associated therewith, and determining an additional goodness fit measurement of said additional coefficients and comparing said initial goodness fit measurement with said additional goodness fit measurement to determine whether said angular deviation has changed.

18. A subsurface gravity measurement device, comprising:

a body;

a tilt meter connected to said body to produce tilt data concerning angular positions said tilt meter forms with respect to a direction of gravity, with said direction of gravity defining a plumb line;

a gravity sensor connected to measure said gravity and to produce information corresponding thereto, defining gravity data, with said information being a function of an angle said gravity measurement device forms with respect to said plumb line, defining tilt information;

a processor in data communication with both said gravity sensor and said tilt meter; and a memory in data communication with said processor, said memory including a computer readable program to be operated on by said processor that includes a first subroutine to define a relationship between said tilt information produced by said gravity sensor and both said tilt data and an initial correction parameter, and a second subroutine to fit said tilt data and said gravity data to a polynomial equation, with said polynomial equation having a plurality of initial coefficients associated therewith, said initial coefficients including information concerning said correction parameter, and a third subroutine to derive a correction parameter as a function of said initial coefficients.

19. The device of claim 18 wherein said subroutine to ascertain said correction parameter further includes a code to determine values for said plurality of initial coefficients using a least-squares regression; and derive said correction parameter as a function of said initial coefficients.

20. The device of claim 18 wherein said subroutine to produce tilt data further includes code to orientate said tilt meter at a plurality of differing angular positions with respect to said plumb line, defining tilt data, and code to measure, with said gravity sensor, gravity information at each of said angular positions, defining said gravity data.

21. The device of claim 18 further including a subroutine to determine whether said initial coefficients satisfy a goodness fit criteria defined by a chi-square statistic, $\chi^2$.

22. The device of claim 21 further including a subroutine to produce additional tilt data and additional gravity data and fit said additional tilt data and said additional gravity data to an additional polynomial equation having additional coefficients associated therewith, upon determining said initial coefficients failed to satisfy said goodness fit criteria, and derive said correction parameter as a function of said additional coefficients.

23. The device of claim 18 wherein said correction parameter includes information concerning the difference in an angular deviation said tilt meter is from said plumb line compared to an angular deviation of said gravity sensor is from said plumb line and further including a subroutine to determine an initial fit measurement of said initial coefficients and produce additional tilt data and additional gravity data and fit said additional tilt data and said additional gravity data to an additional polynomial equation having additional coefficients associated therewith, and determine an additional goodness fit measurement of said additional coefficients and a subroutine to compare said initial goodness fit measurement with said additional goodness fit measurement to determine whether said angular deviation has changed.

* * * * *